United States Patent [19]

Ishibe et al.

[11] Patent Number: 5,657,074
[45] Date of Patent: Aug. 12, 1997

[54] APPARATUS FOR REPRODUCING STILL IMAGES WITH MUSIC

[75] Inventors: Hiroshi Ishibe, Kyoto; Manabu Inoue, Kobe; Hirokazu Yagura, Sakai, all of Japan

[73] Assignee: Minolta Camera Kabushiki Kaisha, Osaka, Japan

[21] Appl. No.: 587,780

[22] Filed: Dec. 26, 1995

Related U.S. Application Data

[63] Continuation of Ser. No. 981,058, Nov. 24, 1992, abandoned.

[30] Foreign Application Priority Data

Nov. 29, 1991 [JP] Japan ..................... 3-317120

[51] Int. Cl.⁶ ........................................ H04N 7/18
[52] U.S. Cl. ................................ 348/96; 360/80
[58] Field of Search ................ 360/80, 79; 348/111, 348/110, 96, 107, 112, 61; 352/31, 32, 33, 37; 353/15, 16, 17, 18, 19, DIG. 2; 434/307, 308; 358/487

[56] References Cited

U.S. PATENT DOCUMENTS

| | | | |
|---|---|---|---|
| D. 295,855 | 5/1988 | Koo | D14/5 |
| D. 296,690 | 7/1988 | Koo | D14/5 |
| 4,357,636 | 11/1982 | Taketomi et al. | 360/62 |
| 4,363,055 | 12/1982 | Lee | 360/80 |
| 4,482,924 | 11/1984 | Brownstein . | |
| 4,485,406 | 11/1984 | Brownstein . | |
| 4,506,300 | 3/1985 | Fearnside | 348/110 |
| 4,603,966 | 8/1986 | Brownstein . | |
| 4,646,170 | 2/1987 | Kobayashi et al. | 360/22 |
| 4,706,117 | 11/1987 | Schoolman | 348/96 |
| 4,777,537 | 10/1988 | Ueno et al. . | |
| 4,782,510 | 11/1988 | Szlam | 379/88 |
| 4,943,853 | 7/1990 | Morisawa | 348/110 |
| 5,081,672 | 1/1992 | Mita et al. | 379/68 |
| 5,128,700 | 7/1992 | Inoue et al. . | |

FOREIGN PATENT DOCUMENTS

| | | | |
|---|---|---|---|
| 4224066 | 12/1992 | Germany | 360/80 |
| 3-127043 | 5/1991 | Japan . | |
| 2119151 | 11/1983 | United Kingdom | 360/80 |

*Primary Examiner*—Amelia Au
*Assistant Examiner*—Bryan S. Tung
*Attorney, Agent, or Firm*—Burns, Doane, Swecker & Mathis, LLP

[57] ABSTRACT

A film player includes an A-D conversion part for receiving a music signal from an external audio unit, a RAM write part for writing A-D converted music data in an integrated RAM, a RAM contained in a music card or a RAM contained in a film cartridge, and a RAM play part for playing music recorded in each RAM. The user externally inputs desired music and records the same in the RAM by an external switch through a control part, to play the music with reproduction of a picture.

19 Claims, 13 Drawing Sheets

APPARATUS FOR REPRODUCING STILL IMAGES WITH MUSIC

This application is a continuation of application Ser. No. 07/981,058, filed Nov. 24, 1992.

BACKGROUND OF THE INVENTION

1. Field of the Invention

The present invention relates to an apparatus, such as a film video player, for reproducing still images of a plurality of frames, and more particularly, it relates to a still image reproducer having a function of reproducing music as a background during reproduction of still images.

2. Description of the Background Art

There has recently been proposed an apparatus for reproducing still images such as pictures recorded in a developed film on a television or the like. If such an apparatus simply reproduces still images, however, it is difficult to satisfy the user. In order to solve this problem, the still images may be reproduced with background music.

When such a still image reproducer has a medium previously storing music, the number of pieces recorded therein is so limited that the user may lose interest. In order to record a number of pieces for satisfying the user, however, it is necessary to provide a recording medium having large capacity and hence the cost of the apparatus is increased.

While U.S. Pat. Nos. 4,482,924, 4,485,406 and 4,603,966 disclose film video players, none of these apparatuses has a function of providing background music.

SUMMARY OF THE INVENTION

An object of the present invention is to provide an apparatus such as a film video player for reproducing still images with a function of providing background music, which has a music reproducing function for entertaining the user.

In order to attain the aforementioned object, a still image reproducer according to the present invention comprises a recording medium for recording music, an input unit for inputting music from the exterior and a music reproducing unit, for recording the music inputted by the input unit in the recording medium and reproducing the recorded music by the music reproducing unit.

According to another aspect of the present invention, a still image reproducer comprises a plurality of music recording media, for selectively reproducing music from one of these media.

According to still another aspect of the present invention, a still image reproducer comprises a recording medium recording a plurality of pieces, for selecting at least one from these pieces and deciding a method of reproducing still images on the basis of information of the selected pieces.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

An embodiment of the present invention is now described with reference to the accompanying drawings.

Figure 1:
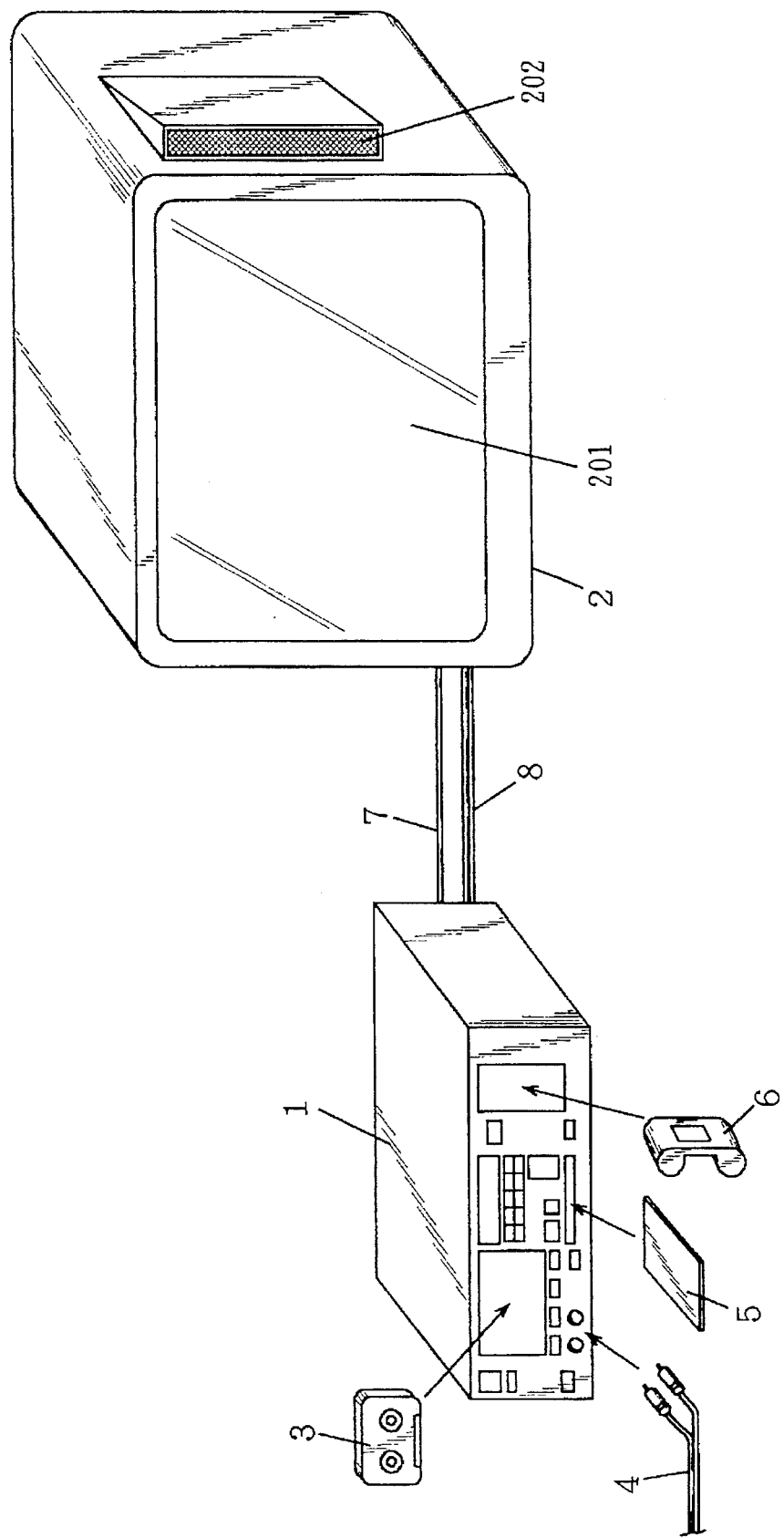
FIG. 1 is a system diagram showing the relation between a film player according to an embodiment of the present invention and a peripheral unit.

FIG. 1 is a system diagram showing the relation between a film player 1 according to an embodiment of the present invention and a peripheral unit.

Referring to FIG. 1, a film player 1 for reproducing music and film pictures is connected with a television monitor 2 for displaying the film through a video signal cable 7 and an audio signal cable 8. The television monitor 2 receives pictures and music signals outputted from the film player 1, to display the pictures on a CRT 201 and output the music through a speaker 202.

The film player 1 can record and reproduce music through a music tape 3 and a music card 5 containing a RAM. The film player 1 can also receive a film cartridge 6 containing a RAM similarly to the music card 5. The music tape 3, the music card 5 and the film cartridge 6 store music pieces to be played. The film player 1 can be connected to an external audio unit (not shown) through a recording cable 4, so that music outputted from the external audio unit is recorded in the film player 1 through the recording cable 4. As shown in FIG. 1, the RAMs contained in the music card 5, the film cartridge 6 and the film player 1 serve as recording media. Music can be recorded also from the music tape 3.

Figure 2:
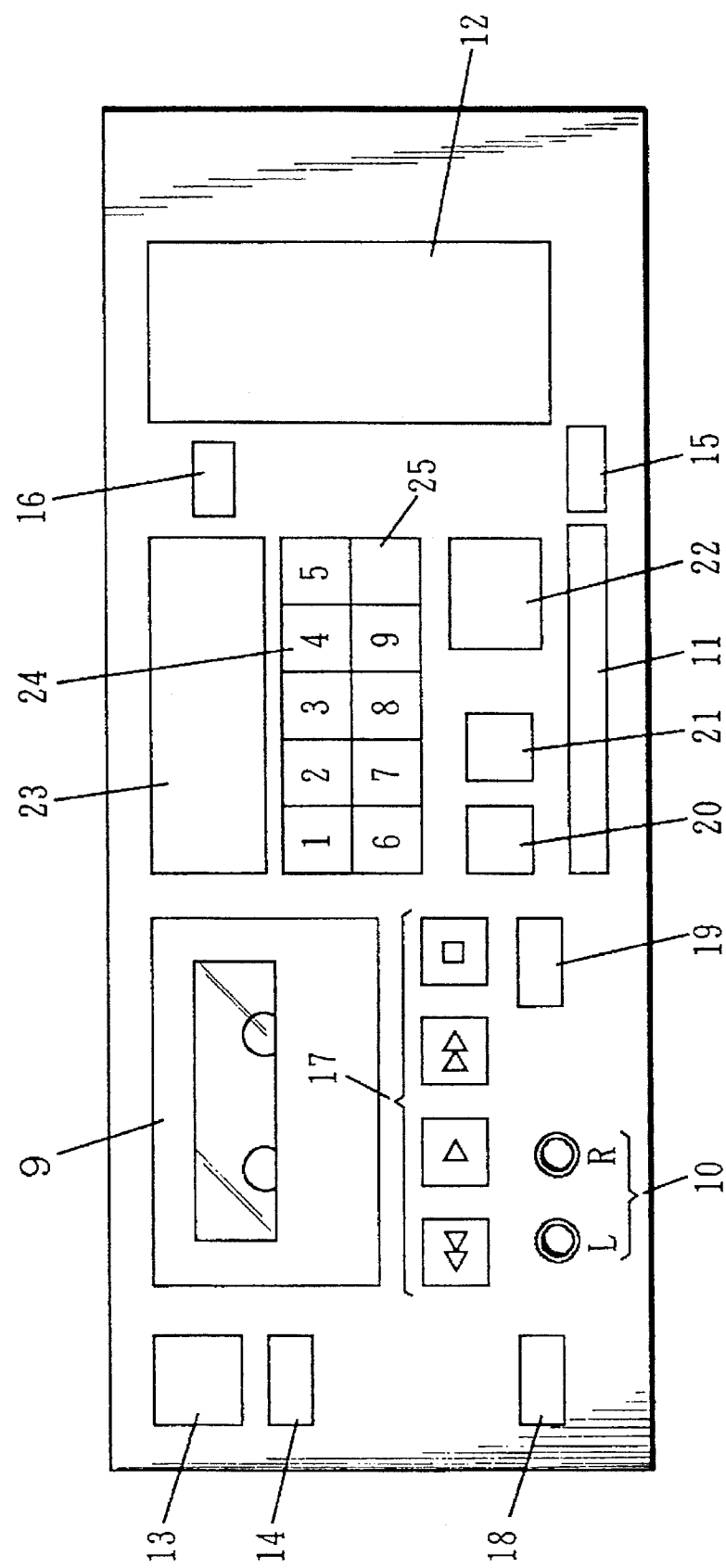
FIG. 2 illustrates an operation panel of the film player.

An operation panel of the film player 1 is now described with reference to FIG. 2. Referring to FIG. 2, the operation panel of the film player 1 is provided with a power switch 13, a music tape loading part 9, a music tape ejection key 14 for ejecting the music tape 3 from the music tape loading part 9, and music tape operation keys 17 for reproducing, fast-forwarding, rewinding and stopping the as-loaded music tape 3.

The film player 1 is further provided with a music card slot 11 for receiving the music card 5 in play or recording, a music card ejection key 15 for ejecting the as-received music card 5, and a tape selection switch 20 for selecting the music tape 3. When the tape selection switch 20 is in an ON state, a piece recorded in the music tape 3 is reproduced and outputted to the television monitor 2 as a music signal. A memory selection switch 21 is provided by the side of the tape selection switch 20, so that music is reproduced from the RAM contained in the music card 5 or the film cartridge 6 or the built-in RAM, to be outputted as a music signal to the television monitor 2 when the memory selection switch 21 is in an ON state.

When both of the tape selection switch 20 and the memory selection switch 21 are in OFF states, a ROM contained in the film player 1 is selected so that music recorded therein is reproduced. The tape selection switch 20 and the memory selection switch 21 are not simultaneously brought into ON states.

The operation panel of the film player 1 is further provided with selection number keys 24 for setting predetermined numbers of pieces recorded in the music recording medium for deciding the pieces to be played. In order to play a film with second and fifth pieces, for example, second ("2") and fifth ("5") ones of the selection number keys 24 may be pushed. In order to cancel or change an erroneously selected piece, a cancel key 25 is pushed. Every time the cancel key 25 is pushed, the finally selected piece is canceled.

The film player 1 is further provided with a display part 23 for displaying the number of the piece specified by one of the selection numbers keys 24, the music medium and the recording medium, thereby ensuring a simple and errorless operation.

The film cartridge 6 is loaded in a film cartridge loading port 12, and ejected through a film cartridge ejection key 16.

A play key 22 is provided under the selection number keys 24, to output the film picture and the selected music to the television monitor 2.

A recording mode switch 18 is provided on a lower left portion of the operation panel, so that the film player 1 enters a recording mode when this switch 18 is in an ON state. Music is supplied from the music tape 3 when the same is loaded in the music tape loading part 9, or from the external audio unit when no tape is loaded in the music tape loading part 9.

The music from the external audio unit is inputted in an audio input terminal 10 through the recording cable 4. The RAMs contained in the music card 3 and the film cartridge 5 and the integrated RAM serve as recording media in the aforementioned order of precedence.

Recording is started by a recording switch 19. When the music is supplied from the music tape 3, reproduction of this tape is simultaneously started. Therefore, it is necessary to program-search the pieces through the music tape operation keys 17 in advance. When the music is supplied from the external audio unit, on the other hand, it is necessary to simultaneously start reproduction of the music from the external audio unit and recording thereof.

In order to determine the end of each piece, a silent part exceeding a constant period is recorded between the pieces.

The film cartridge 6 and a film according to the present invention are now described.

Figure 3:
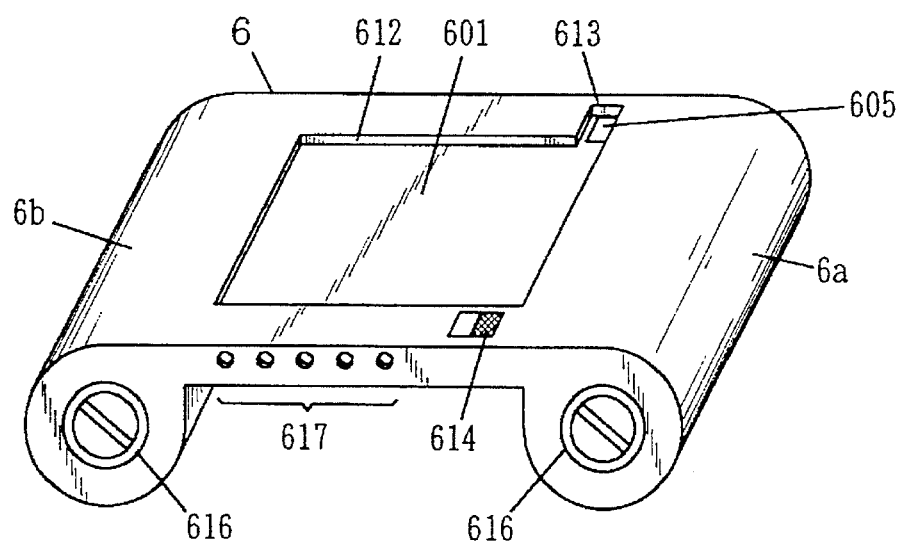
FIG. 3 illustrates the appearance of a film cartridge.

FIG. 3 illustrates the appearance of the film cartridge 6, which is provided with film receiving parts 6a and 6b on both ends thereof so that a developed film 601 is wound on winding shafts provided in the film receiving parts 6a and 6b and received therein. It is possible to feed the film 601 by rotating winding shaft driving members 616 which are coupled with the winding shafts.

An aperture 612 is provided between the film receiving parts 6a and 6b, so that the user can observe a picture for one frame shot by a camera. This aperture 612 passes through the film cartridge 6, so that the film 601 is illuminated from the back side and the user can observe the picture provided thereon through transmitted light. Further, it is possible to print the picture on photographic paper or incorporate the same through a pickup sensor.

The aperture 612 has a notch 613 in a portion corresponding to perforations 605 provided in the film 601, to detect such perforations 605.

Figure 4:
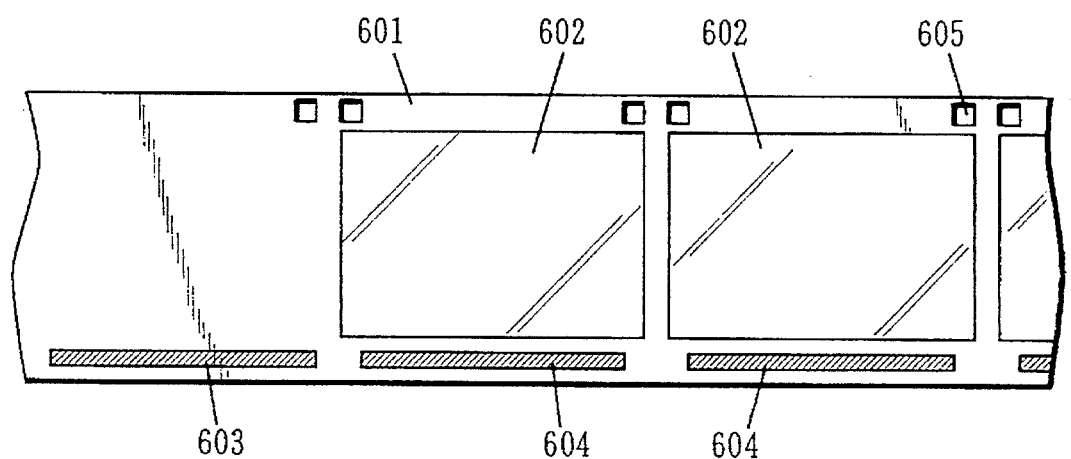
FIG. 4 illustrates a film according to the embodiment.
Figure 5:
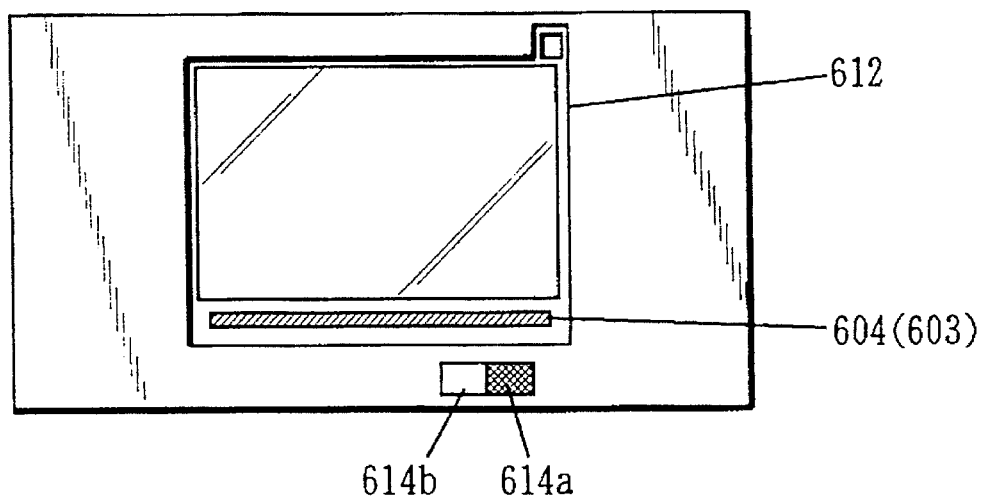
FIG. 5 illustrates an aperture of the film cartridge.

As shown in FIG. 4, relative positional relations between the perforations 605 and photographic parts 602 of the film 601 are so decided that each photographic part 602 can be stopped at the position of the aperture 612 by positioning each perforation 605. FIG. 5 shows such a state on the upper surface of the aperture 612.

Referring again to FIG. 3, the film cartridge 6 is provided with music input terminals 615, and contains a memory which can store several music pieces to be played through the film player 1. This memory is formed by a RAM or an EEPROM, and requires a backup battery if the same is formed by a RAM. According to this embodiment, the memory is formed by a RAM.

Since the RAM is writable, the user can select and record pieces in response to the situation of the film 601, thereby improving the effect of the play through the film player 1. The pictures and the music are stored in a single cartridge, for convenience in preservation and reproduction.

A recording inhibition switch 614 is provided on the upper surface of the film cartridge 6, to prevent erroneous erasing of recorded pieces, as described later with reference to FIG. 5 in detail. A leftwardly slidable member 614a (FIG. 5) can block a through hole 614b. In advance of recording, the film player 1 detects the through hole 614b by a photointerruptor or the like to execute recording if the same is open while stopping recording in other case. Thus, it is possible to set inhibition or allowance of recording by detecting the position of the slidable member 614a.

FIG. 4 shows the film 601 according to the present invention. Due to the relative positional relations between the perforations 605 and the photographic parts 602, it is possible to search the position of each photographic part 602. Further, it is also possible to count the number of the frames.

The film 601 is provided under each photographic part 602 with a magnetic information area 604 which stores shooting information as to each frame for magnetically recording the date and the time of shooting of each frame. No such photographic part 602 is provided on each end of the film 601, so that the photographic parts 602 can be completely received in the film receiving part 6a or 6b and protected when the film 601 is completely wound or rewound. An information recording area 603 is provided under each end portion provided with no photographic part 602, for recording information as to basic image blocks (IBs) described later. Each of the information recording areas 603 and 604 is in a position readable and writable through the aperture 612 as shown in FIG. 5, so that information can be read and written from and in the same with a magnetic head during feeding of the film 601.

Figure 6:
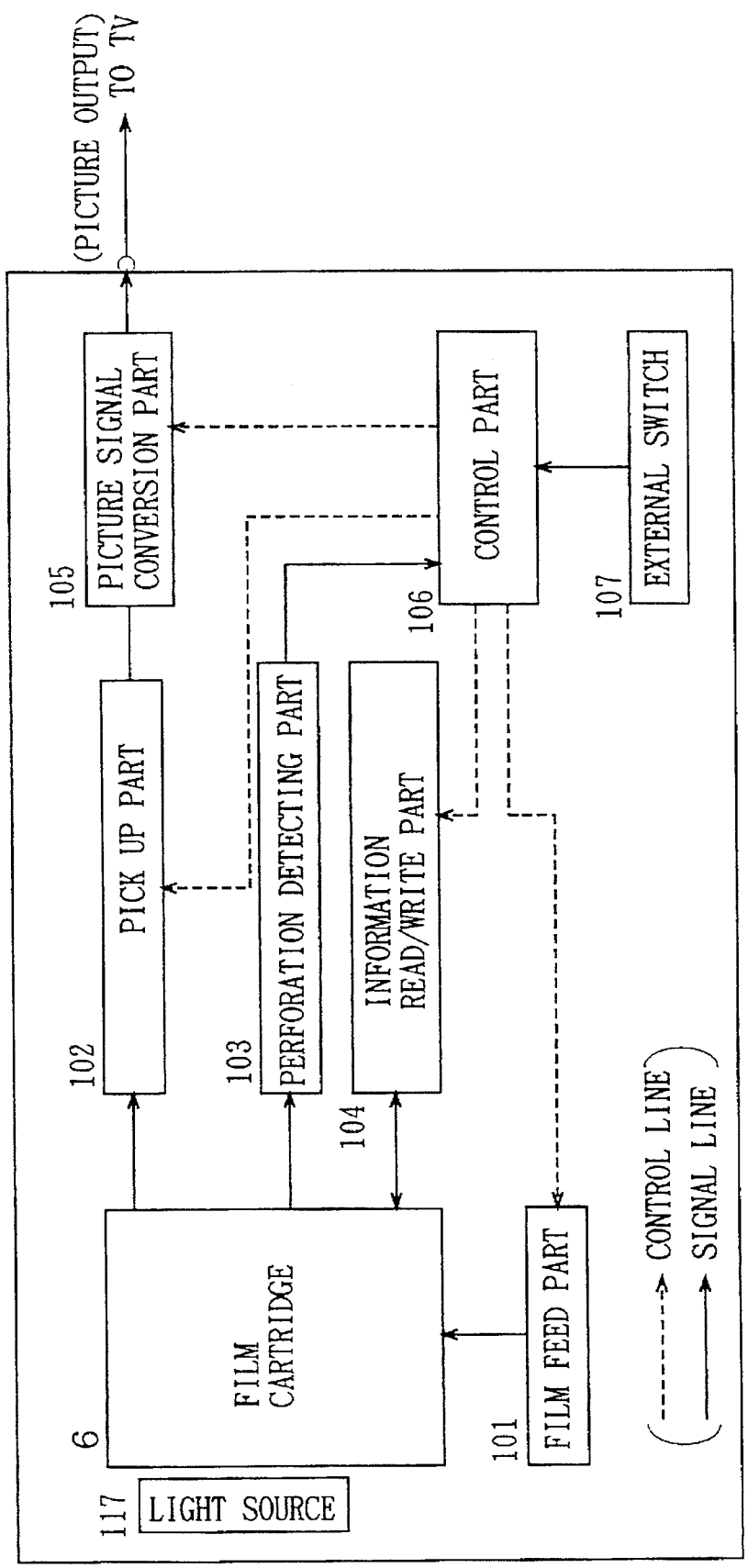
FIG. 6 is a block diagram showing a principal part for processing pictures provided on the film.

The internal structure of the film player 1 is now described with reference to a block diagram shown in FIG. 6 in relation to picture processing. Information from an external switch 107, which generically represents the switches shown in FIG. 2, is transmitted to a control part 106. In response to the information received from the external switch 107, the control part 106 controls feeding of the film, reading/writing of shooting information and picture output.

A film fed part 101 winds, rewinds or frame-feeds the film 601 contained in the film cartridge 6 in response to a control signal received from the control part 106. A perforation detecting part 103 detects the perforations 605, to search the position of the film for frame-feeding the same by the control part 106 or provide information for counting the frames of the film in winding or rewinding.

An information read/write part 104 reads/writes information magnetically recorded on the film 601 with a magnetic head, which is pressed against the information recording parts 603 and 604 of the film 601 to read/write the information when the film is fed by the film feed part 101.

A pickup part 102 incorporates a picture for one frame which is illuminated by a light source 117 provided on the back side of the film cartridge 6. A pickup sensor may be formed by an area sensor or a line sensor having a scanning mechanism. A picture signal conversion part 105 converts a picture signal received from the film pickup part 102 to an NTSC signal which can be inputted in a general television.

Figure 7:
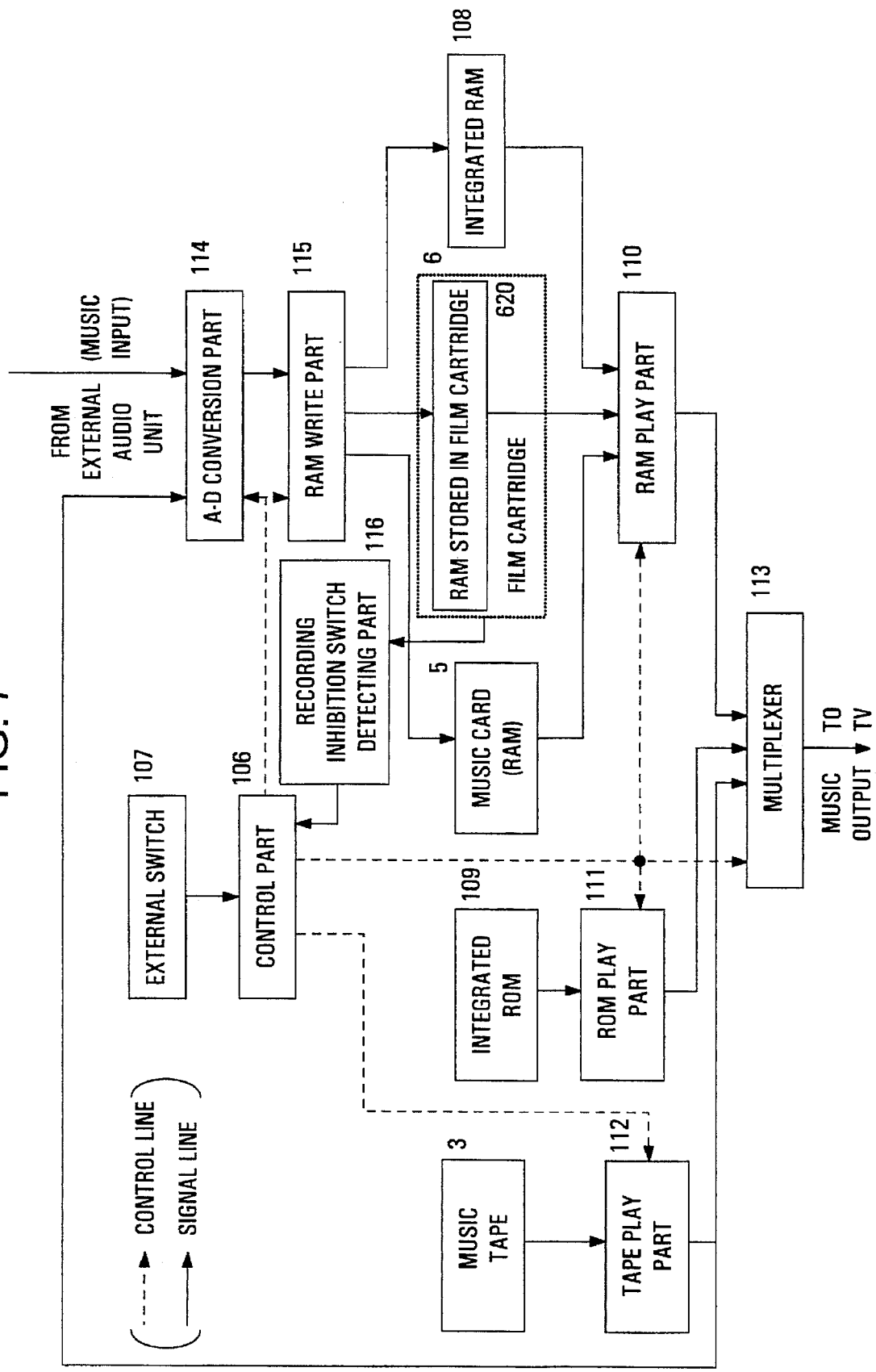
FIG. 7 is a block diagram showing a principal part for processing music information.

FIG. 7 is a block diagram in relation to music processing. The film player 1 has five music sources of an integrated RAM 108, a RAM 620 contained in the film cartridge 6, the music card (RAM) 5, an integrated ROM 109 and the music tape 3. Among these, the integrated RAM 108, the RAM 620 contained in the film cartridge 6 and the music card 5 are capable of recording, while music sources for such recording are the input from the external audio unit and the music tape 3. The control part 106 controls music reproduction in the recording and play.

Data stored in the integrated RAM 108, the RAM 620 contained in the film cartridge 6 and the music card 5 are read by a RAM play part 110 and converted to music signals, to be transmitted to a multiplexer 113. The data are read from the music card 5, the RAM 620 contained in the film cartridge 6 and the integrated RAM 108 in this order of precedence. Each RAM has a backup battery.

The information stored in the music tape 3 is reproduced by a tape play part 112, to be transmitted to the multiplexer 113 as a music signal. The information stored in the integrated ROM 109 is read by a ROM play part 111 and converted to a music signal, to be transmitted to the multiplexer 113.

The aforementioned three play parts, i.e., the RAM play part 110, the ROM play part 111 and the tape play part 112, are driven by instructions from the control part 106. Selection of the play part depends on the states of the tape selection switch 20 and the memory selection switch 21 included in the external switch 107. The tape play part 112 is selected if the tape selection switch 20 is in an ON state, while the RAM play part 110 is selected if the memory selection switch 21 is in an ON state. On the other hand, the ROM play part 111 is selected if both of the switches 20 and 21 are in ON states.

In response to a signal received from the control part 106, the multiplexer 113 outputs the signal from the selected play part to the television monitor 2 as a music output.

An A-D conversion part 114 digitalizes a music signal received from the external audio unit or that obtained by reproducing the music tape 3, to record the same in the music card 5, the RAM 620 contained in the film cartridge 6 and the integrated RAM 108 in this order of precedence by a RAM write part 115. When the music tape 3 is loaded in the music tape loading part 9, the music signal therefrom is recorded in precedence to the external input.

A recording inhibition switch detecting part 116 detects the state of the recording inhibition switch 614 provided on the film cartridge 6 through a photointerruptor or the like, and transmits information to the control part 106. If the recording inhibition switch 614 is in a recording inhibition state, the control part 106 stops recording.

A rule for playing the picture and music according to the present invention is now described. The film player 1 simultaneously outputs the picture and the music on the television monitor 2. If the music is switched during output of a picture or the final frame of the picture is not simultaneously ended with the music, no synchronicity is attained between the picture and the music. According to the inventive film player 1, therefore, the music is switched simultaneously with the picture, and the final frame of the picture is simultaneously ended with the music. To this end, basic image blocks and play image blocks are considered.

Figure 8:
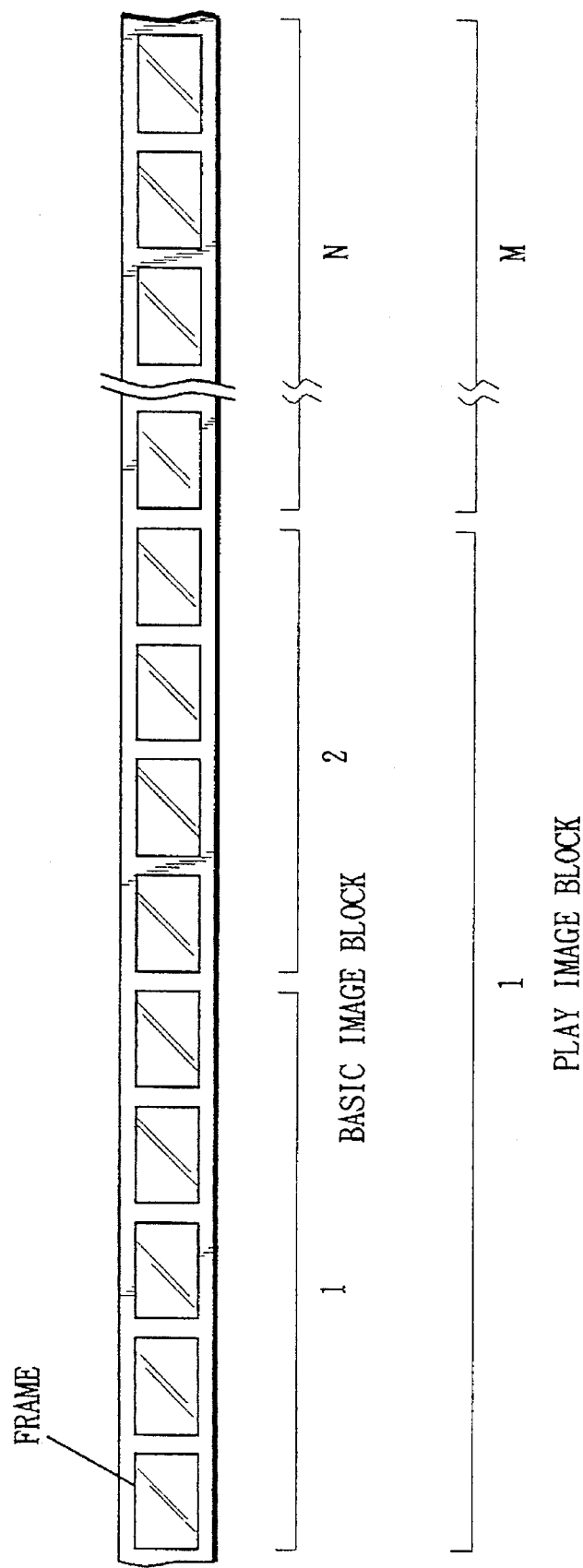
FIG. 8 illustrates the relations between film frames, basic image blocks and play image blocks.

The basic and play image blocks are now described with reference to FIG. 8. First, a picture on the film 601 is divided into blocks, called image blocks, each containing a plurality of pictures. Date information and time information are read from the information recording part 604 of the film 601 every frame, to divide the picture into the image blocks at portions separated from each other at large shooting time intervals between the frames. The number of the image blocks is made larger than the maximum number of pieces to be played. When a film is shot over three days, for example, frames shot in one day are adapted to define a single image block, which in turn is further divided in response to times. When a film is shot in one day, on the other hand, the pictures are divided depending on only the shooting times. The image blocks divided in response to only the date information and time information of the film are called basic image blocks. Division of the basic image blocks depends on the film. It is not preferable to access the date information and time information of all frames every play, since starting of the play is retarded in this case. Basic image blocks once formed are recorded in the information recording part 603 provided on each end of the film 601, as shown in FIG. 4. The contents of recording are the number N of the basic image blocks and the number of frames provided in each basic image blocks. Then the number N of the basic image blocks is matched with the number M of selected pieces.

The number N of the basic image blocks, which is larger than the number M of the pieces, is then reduced. In order to reduce the number N of the basic image blocks, a pair of adjacent image blocks having the minimum total number of frames is found to define a single image block. This operation is repeated until the number N of the image blocks is equal to the number M of the pieces. The image blocks thus divided in response to the number M of the pieces is called play image blocks. The play image blocks are not recorded on the film since the manner of division is varied with the number of the pieces.

The waiting time for second or later play is reduced by forming and recording the basic images as hereinabove described, while the picture and the music are simultaneously switched and ended by formation of the play image blocks. Since the image blocks are divided on the basis of the shooting time, the pieces are switched in response to the situation of shooting.

Figure 9:
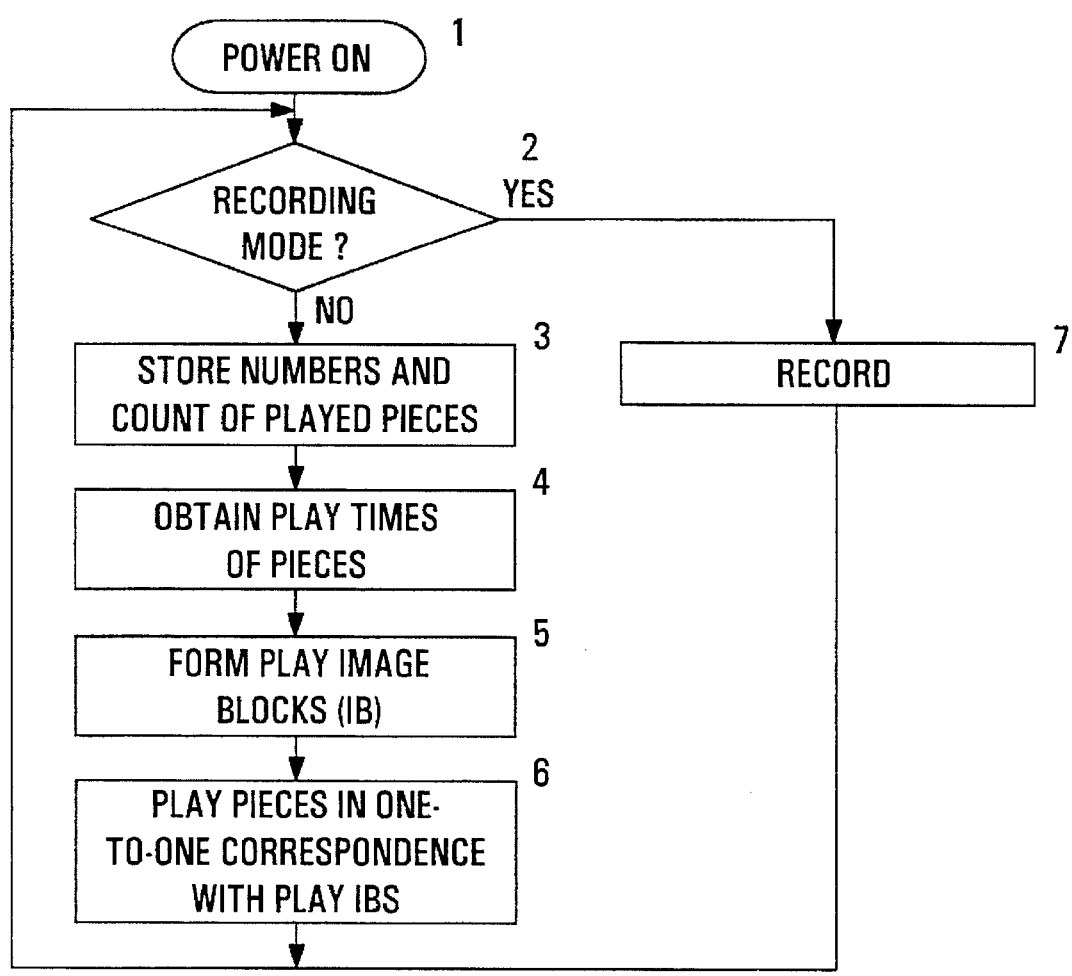
FIG. 9 is a flow chart schematically showing the procedure of forming the play image blocks.

The procedure of the film player 1 according to this embodiment is now described with reference to flow charts. FIG. 9 schematically illustrates the procedure of this embodiment. The detail of the procedure is described later with reference to FIGS. 10 to 14.

At a step #1, the power switch 13 is turned on to apply power to the film player 1, thereby starting the procedure. At a step #2, a determination is made as to whether the process is advanced to a play step #3 or a recording step #7. The process is advanced to the play step #3 if the recording mode switch 18 is in an OFF state, while the same is advanced to the recording step #7 if the switch 18 is in an ON state. At the step #3, numbers of pieces selected by the user for play and the count thereof are stored. At a step #4, the selected pieces are retrieved from the music medium for the play through the numbers stored at the step #3, so that play times thereof are obtained.

At a step #5, overall frames provided on the film are divided into play image blocks (hereinafter referred to as IBs), each of which is formed by frames outputted on the television monitor 2 during the play time for one piece. The play IBs are formed by combinations of basic IBs which are divided on the basis of times of shooting in a number equal to that of the pieces stored at the step #3. At a step #6, the pieces selected at the step #3 are played in one-to-one correspondence with the play IBs formed at the step #5. The play IBs are outputted for times identical to the play times obtained at the step #4, so that the pictures and the pieces are switched and ended simultaneously with each other. When all play IBs and pieces are ended, the process is returned to the step #2.

At the step #7, on the other hand, pieces inputted from the external audio unit or the music tape 3 are recorded in a recordable recording medium. Thereafter the process is returned to the step #2. The procedures at the steps #3 an #7 are now described in detail with reference to FIGS. 10 to 14.

Figure 10:
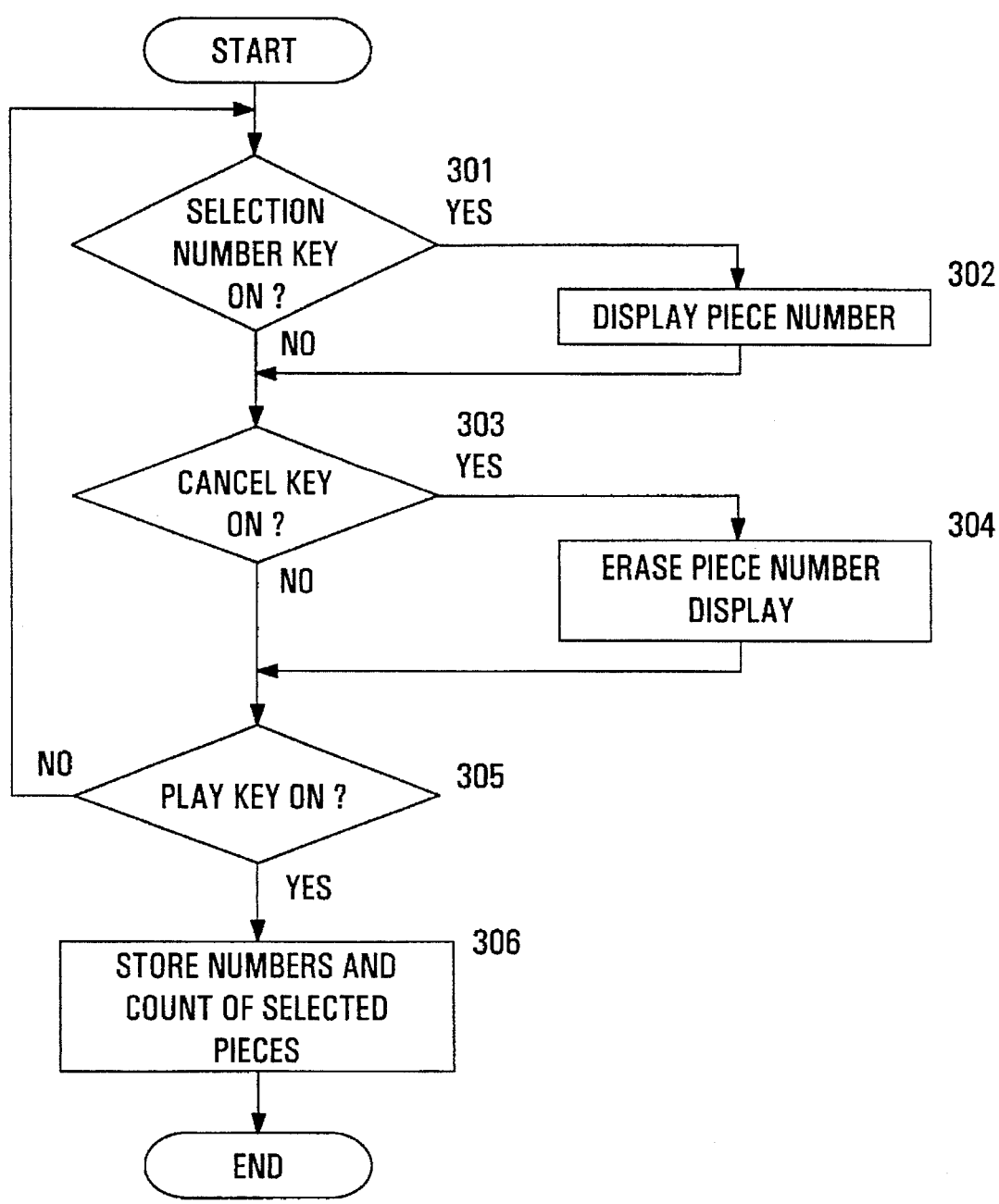
FIG. 10 is a flow chart showing the procedure of forming the play image blocks.

FIG. 10 is a flow chart illustrating the content of the procedure at the step #3 shown in FIG. 9. A user input waiting loop is formed at steps #301, #303 and #305. A determination is made at the step #301 as to whether or not any of the selection number keys 24 is in an ON state. The selection number keys 24 are formed by keys numbered 1 to 9 for indicating the numbers of the pieces. If any one of the selection number keys 24 is in an ON state, the process is advanced to the step #302.

At the step #302, the number of the piece selected at the step #301 is displayed on the display part 23. If the selected piece is a second or later one, the number of this piece is displayed after an already displayed number. Nine pieces are selected at the maximum, for example. At the step #303, a determination is made as to whether or not the cancel key 25 is in an ON state. If the cancel key 25 is in an ON state, the process is advanced to a step #304 in order to correct or delete the piece numbers. If the cancel key 25 is in an OFF state, on the other hand, the process is advanced to the step #305.

At the step #304, display of only one piece number selected immediately in advance of this step is erased. If no piece number is displayed, the process is directly advanced to the step #305. At the step #305, a determination is made as to whether or not the play key 22 is in an ON state. If the play key 22 is in an OFF state, the process is returned to the step #301 to continue the input waiting loop. If the play key 22 is in an ON state, on the other hand, the input waiting loop is ended and the process is advanced to a step #306. At the step #306, the piece numbers and the count thereof displayed as the final result of selection are stored in a storage part (RAM) provided in the control part 106. The piece numbers are required for selecting the pieces to be played, and the count thereof is required for dividing the play IBs.

Figure 11:
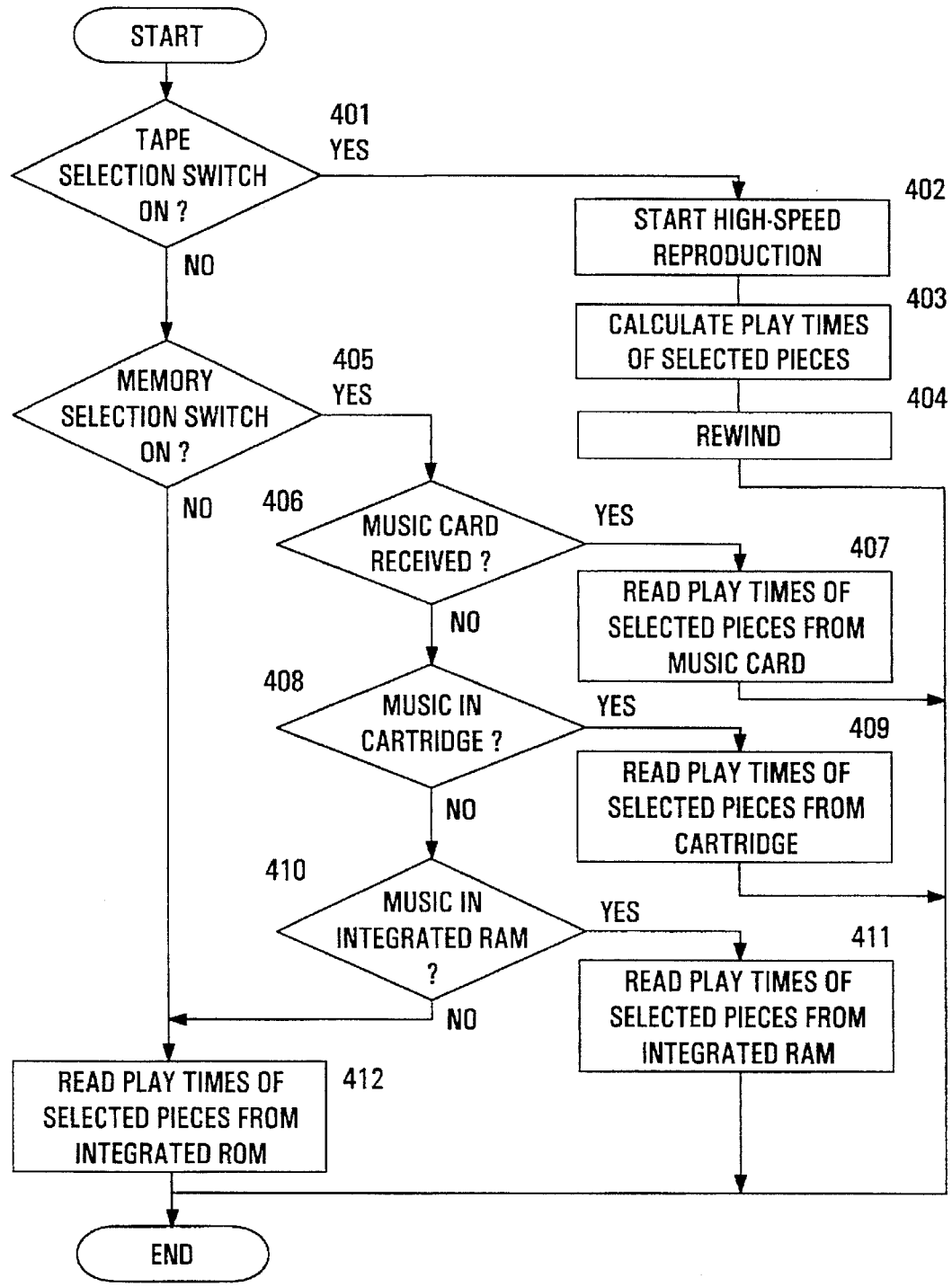
FIG. 11 is a flow chart showing the procedure of forming the play image blocks.

FIG. 11 is a flow chart illustrating the content of the procedure at the step #4 shown in FIG. 9. At a step #401, a determination is made as to whether or not the music tape 3 is selected as the music medium. If the tape selection switch 20 is in an ON state, the music tape 3 is selected and the process is advanced to a step #402. If the tape selection switch 20 is in an OFF state, on the other hand, the process is advanced to a step #405. At the step #402, the pieces specified by the piece numbers are reproduced at a high speed from the head. At this time, no music signal is outputted to the television monitor 2.

At a step #403, actual play times are calculated from the times required for reproducing the selected pieces at a high speed. The play times are required for deciding the output times of the film. After the play times of all selected pieces are completely calculated, the tape is rewound to the head of the first piece at a step #404, to end the processing at the step #4. In such a series of tape operation, pauses between the pieces are judged by the silent parts.

At the step #405, a determination is made as to whether or not the RAM such as the music card 5, the RAM 620 contained in the film cartridge 6 or the integrated RAM 108 is selected as the play music medium. If the memory selection switch 21 is in an ON state, the determination at the step #405 is of yes and the process is advanced to a step #406. If the memory selection switch 21 is in an OFF state, on the other hand, the process is advanced to a step #412.

At the step #406, a determination is made as to whether or not the music card 5 is received in the music card slot 11. If the determination is of yes, the music card 5 is selected as the music medium and the process is advanced to a step #407. If no music card is received, on the other hand, the process is advanced to a step #408 in order to detect the RAM 620 contained in the film cartridge 6. At the step #407, the play times for the pieces recorded in the music card 5 which are specified by the piece numbers are obtained from head and end addresses of the pieces separated by the silent parts. When the play times for all selected pieces are completely calculated, the procedure at the step #4 is ended.

At the step #408, a determination is made as to whether or not music is recorded in the RAM 602 contained in the film cartridge 6 which is loaded in the film cartridge loading port 12, and the process is advanced to a step #409 if the determination is of yes. If no film cartridge is loaded or the RAM 602 stores no music, the process is advanced to a step #410.

At the step #409, the play times for the pieces recorded in the RAM 602 stored in the film cartridge 6 which are specified by the piece numbers are obtained from head and end addresses of the pieces separated by the silent parts. When the play times for all selected pieces are completely calculated, the process at the step #4 is ended.

At the step #410, a determination is made as to whether or not music is recorded in the integrated RAM 108. If the determination is of yes, the process is advanced to a step #411. If the determination is of no, on the other hand, the process is advanced to a step #412.

At the step #411, the play times for the pieces stored in the integrated RAM 108 which are specified by the piece numbers are obtained from head and end addresses of the pieces separated by the silent parts. When the play times for all selected pieces are completely calculated, the process at the step #4 is ended.

At the step #412, the play times for the pieces stored in the integrated ROM 109 which are specified by the piece numbers are obtained from head and end addresses of the pieces separated by the silent parts. When the play times for all selected pieces are completely calculated, the process at the step #4 is ended. Due to provision of the integrated ROM 109, it is possible to play music even if the user prepares no pieces.

Figure 12:
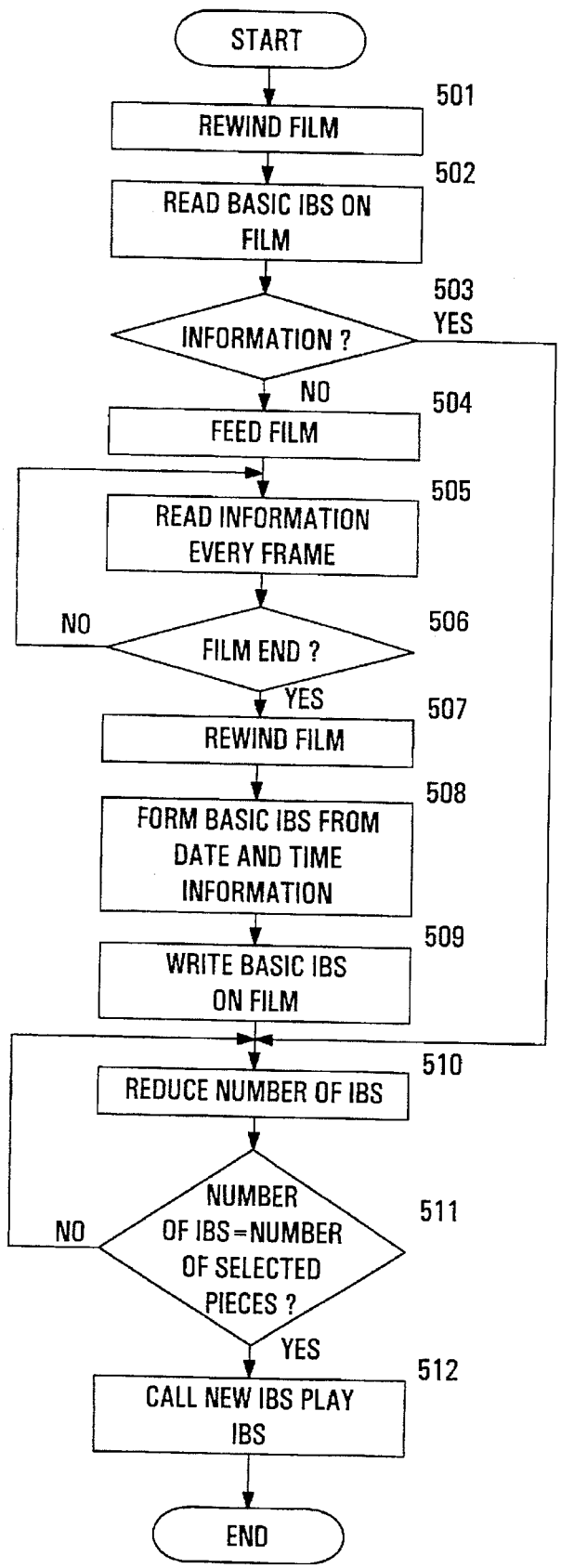
FIG. 12 is a flow chart showing the procedure of forming the play image blocks.

FIG. 12 is a flow chart illustrating the content of the procedure at the step #5 shown in FIG. 9. At a step #501, the film contained in the film cartridge 6 is rewound. While the film is rewound at the end of film play and hence it is not necessary to perform this processing in general, the step #501 is carried out on the assumption that the film may be stopped in an intermediate stage by some cause. At a step #502, information is read from the information recording area 603 provided under the head portion of the first frame storing no picture by the magnetic head for protecting the pictures provided on the film while feeding the film.

At a step #503, a determination is made as to whether or not the content read at the step #502 is related to the basic IBs. If the determination is of yes, it is assumed that the film is an already played one requiring no formation of the basic IBs, and the process is advanced to a step #510. If the determination at the step #503 is of no, on the other hand, the film is a new one and the process is advanced to a basic IB forming step #504.

At the step #504, film feeding is started in order to read shooting information of each frame by the magnetic head. At a step #505, the shooting information is read from the film by the magnetic head. In order to form the basic IBs, date information and time information are required. At a step #506, the perforations 605 of the film are detected by the perforation detecting part 103, to judge the end of the film. The step #505 is repeated until all shooting information is read.

At a step #507, the film from which all shooting information is read is rewound. At a step #508, all frames are divided into blocks from the date information and time information included in the as-read shooting information, to form the basic IBs. The number of the basic IBs is made larger than that of the pieces selected for the play. At a step #509, the structure of the basic IBs formed at the step #508 is written in the information recording area 603 provided on the film. In more concrete terms, the number of the basic IBs and that of frames provided in each basic IB are written in this step. Since the structure of the basic IBs is written in the film itself, it is not necessary to again read the shooting information of the overall film and the preparation time is reduced for the next play.

At steps #510 and #511, the number of the basic IBs formed from only the film information is matched with the number of the selected pieces. At this time, the number of the basic IBs, which is made larger than that of the selected pieces, may be simply reduced. In order to reduce the number of the basic IBs, a pair of adjacent IBs having the minimum total number of frames is found to define a single IB. Thus, the numbers of frames outputted for single pieces are averaged. At a step #512, the IBs matched with the selected pieces in number are called play IBs, and stored in the storage part (RAM) provided in the control part 106. The play IBs are formed every play since the structure thereof is varied with the number of the pieces to be played, and not written in the film.

Figure 13:
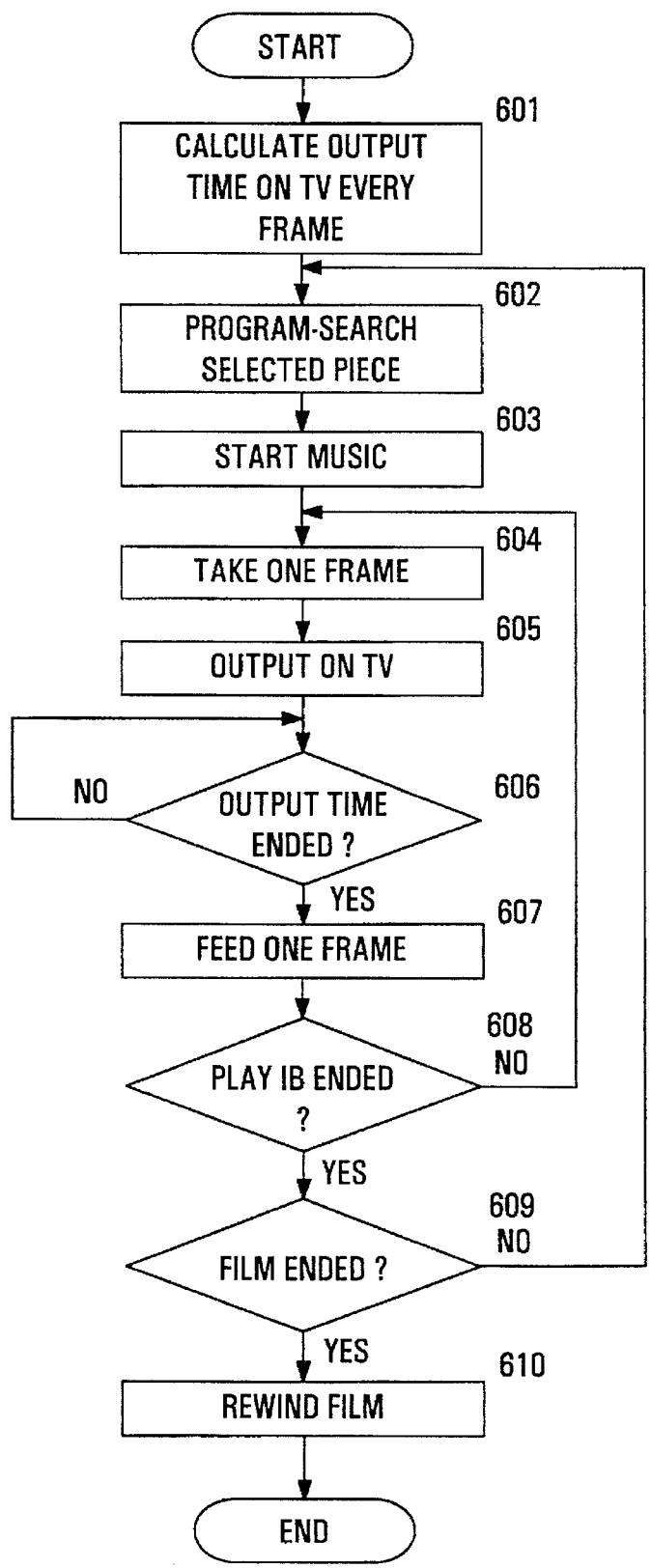
FIG. 13 is a flow chart showing the procedure of forming the play image blocks.

FIG. 13 is a flow chart illustrating the content of the procedure at the step #6 shown in FIG. 9. At a step #601, an output time on the television monitor 2 is calculated every frame. The output time for each frame can be decided at this step since the output times of the play IBs are in one-to-one correspondence to the play times for the pieces while the numbers of frames included in the play IBs are recognized at the step #5 and the play times for the pieces are recognized at the step #4. A play loop is formed at steps #602 to #609. Each loop is for each play IB (one piece).

At the step #602, a selected piece is program-searched by feeding the music tape 3 or addressing the memory. At the step #603, play of the piece being program-searched at the step #602 is started. At the step #604, a picture of one frame provided on the film is converted to an electric signal by the film pickup part 102. At the step #605, the electric signal outputted at the step #604 is converted to an NTSC signal by the picture signal conversion part 105, to be outputted on the television monitor 2.

At the step #606, the output time of each frame calculated at the step #601 is counted, and the process is advanced to the step #607 if the output time is ended. At the step #607, the film is fed by one frame to take the next frame by the film pickup part 102. At the step #608, a determination is made as to whether or not the frames in the play IB are completely outputted, and the process is returned to the step #604 if the determination is of no. One frame is outputted at the steps #604 to #608.

At the step #609, a determination is made as to whether or not all play IBs are completely played, and the process is returned to the step #602 if the determination is of no. At a step #610, the film is rewound for next play.

Figure 14:
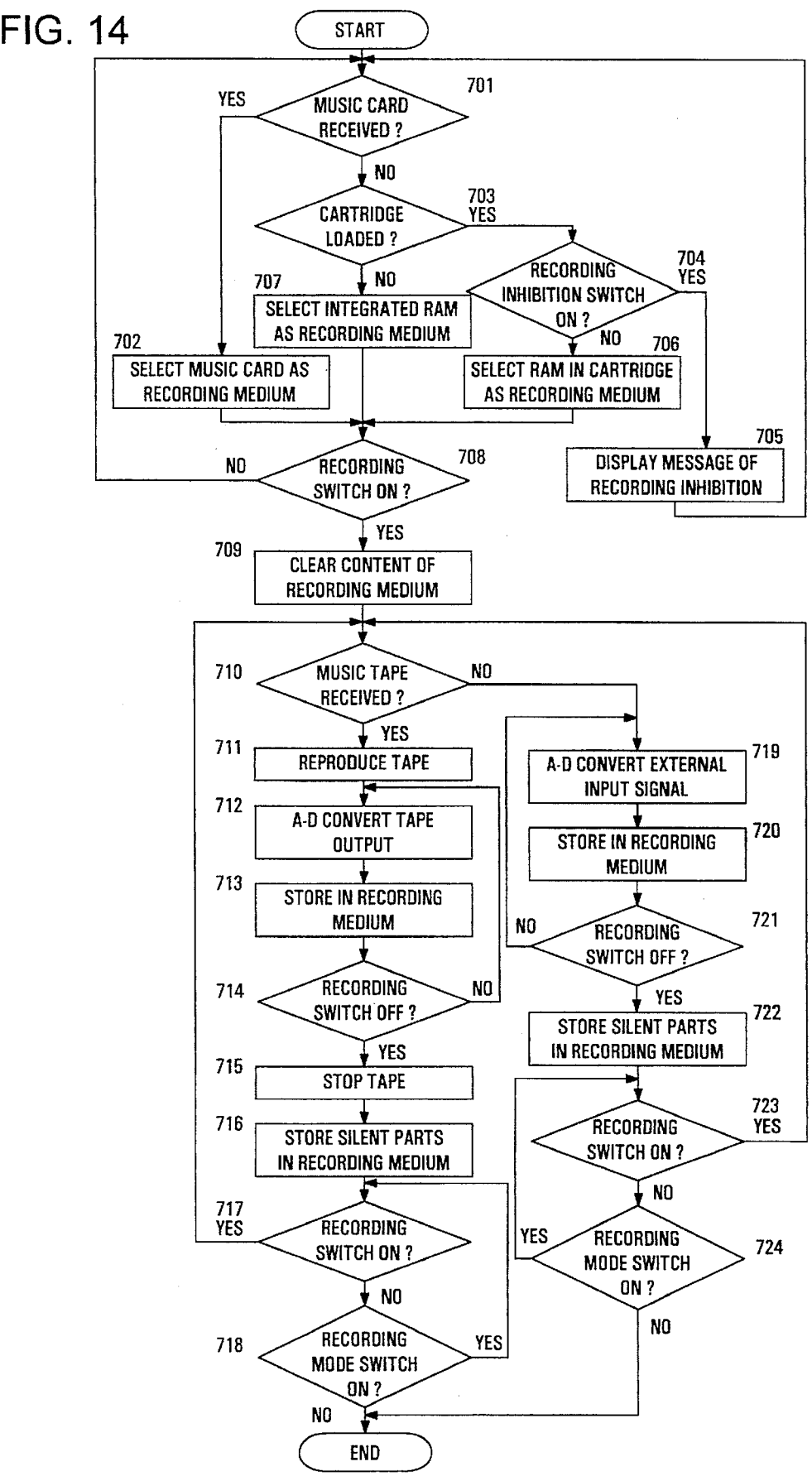
FIG. 14 is a flow chart showing the procedure of forming the play image blocks.

FIG. 14 is a flow chart illustrating the content of the procedure at the step #7 shown in FIG. 9. An input loop for deciding the recording medium is formed at steps #701 to #708. At the step #701, a determination is made as to whether or not the music card 5 is received in the music card slot 11, and the process is advanced to the step #702 if the determination is of yes, while the same is advanced to the step #703 if the determination is of no. At the step #702, the music card 5 is selected as the recording medium, and this selection is displayed on the display part 23.

At the step #703, a determination is made as to whether or not the film cartridge 6 is loaded on the film cartridge loading port 12, and the process is advanced to the step #704 if the determination is of yes, while the same is advanced to the step #707 if the determination is of no. At the step #704, the recording inhibition switch 614 provided on the film cartridge 6 is detected by the recording inhibition switch detecting part 116, so that the process is advanced to the step #705 if recording is inhibited, while the same is advanced to the step #706 if recording is allowed.

At the step #705, a message indicating the recording inhibition for the RAM 602 contained in the film cartridge 6 is displayed on the display part 23, and the process is returned to the step #701. At the step #706, the RAM 602 provided in the film cartridge 6 is selected as the recording medium, and this selection is displayed on the display part 23. At the step #707, the integrated RAM 108 is selected as the recording medium since neither the music card 5 nor the film cartridge 6 is received in the film player 1, and this selection is displayed on the display part 23.

At the step #708, the recording switch 19 is detected so that the process is returned to the step #701 if the switch 19 is in an OFF state while the same is advanced to the step #709 to start recording if the switch 19 is in an ON state. At the step #709, the content of the recording medium selected at the steps #701 to #708 is cleared. At the step #710, a determination is made as to whether the music is supplied from the music tape 3 or the external input signal received from the external audio unit, depending on whether or not the music tape 3 is received in the film player 1. The process is advanced to a step #711 if the music tape 3 is received, while the external input signal is selected and the process is advanced to a step #719 if no music tape 3 is received.

At the step #711, reproduction of the music tape 3 is started. Since the music tape 3 is reproduced in association with the recording switch 19, the pieces must be previously program-searched by the music tape operation keys 17. At a step #712, analog signals reproduced from the music tape 3 are converted to digital signals. At a step #713, the digital signals received from the step #712 are successively stored in the as-selected recording medium. At a step #714, the recording switch 19 is detected so that the process is returned to the step #712 and recording is continued if the switch 19 is in an ON state.

If the recording switch 19 is in an OFF state, on the other hand, the recording is ended and the process is advanced to a step #715. At the step #715, the music tape 3 serving as the music supply source is stopped. At a step #716, silent parts are added to the recording medium for separating the pieces. During play of the music, the silent parts are detected to recognize beginnings and ends of the pieces. At steps #717 and #718, determinations are made as to whether or not the recording is continued or ended for entering a play mode. When the recording switch 19 enters an ON state, the process is returned to the step #710 to re-start the recording. When the recording mode switch 19 enters an OFF state, the process at the step 17 is ended to enter the play mode. During the steps #717 and #718, the pieces stored in the music tape 3 can be program-searched through the music tape operation keys 17.

At a step #719, analog external input signals received from the external audio unit are converted to digital signals. At a step #720, the digital signals received from the step #719 are successively stored in the as-selected recording medium. At a step #721, the recording switch 19 is detected so that the process is returned to the step #719 to continue the recording if the switch 19 is in an ON state. If the recording switch 19 is in an OFF state, on the other hand, the recording is ended and the process is advanced to a step #722.

At the step #722, silent parts are added to the recording medium for separating the pieces. In play of the music, the silent parts are detected to recognize the beginnings and ends of the pieces. At steps #723 and #724, determinations are made as to whether the recording is continued or ended to enter a play mode. When the recording switch 19 enters an ON state, the process is returned to the step #710 to re-start the recording. When the recording mode switch 18 enters an OFF state, the process at the step #7 is terminated to enter the play mode.

Although the music tape 3 is employed as one of the music recording media according to the embodiment, the same may be replaced by a digital compact cassette (DCC), a digital audio tape (DAT) or an optical disk (compact disk (CD) or mini disk (MD)).

The pieces recorded in the integrated ROM 109 may be recorded in the integrated RAM 108, the RAM 620 contained in the film cartridge 6 or the RAM stored in the music card 5. In order to record the pieces recorded in the integrated ROM 109 in the RAM contained in the cartridge 6, for example, arbitrary pieces stored in a certain unit are recorded in the RAM 620. This cartridge 6 is loaded in another unit, so that the arbitrary pieces can be played in another unit storing no such pieces.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A still image reproducing apparatus for reproducing at least one still image recorded in a developed film, said apparatus comprising:

a recording medium for recording music, which is mountable on said apparatus;

input means for inputting music in said apparatus from the exterior thereof;

recording means for recording music being input by said input means on said recording medium;

music reproducing means for reproducing said music recorded on said recording medium;

calculating means for calculating the time required to reproduce music to be reproduced; and still image reproducing means for reproducing said still image in different ways in accordance with the time calculated by said calculating means.

2. A still image reproducing apparatus in accordance with claim 1, further comprising rewrite means for rewriting music recorded on said recording medium in response to a music inputting operation of said input means.

3. A still image reproducing apparatus in accordance with claim 1, wherein said still image reproducing means reproduces said still image on a display device that is separate from said apparatus.

4. A still image reproducing apparatus in accordance with claim 1, wherein said recording medium is capable of recording plural pieces of music and said music reproducing means includes selecting means for selecting at least one of said plural pieces and reproducing the selected piece.

5. A still image reproducing apparatus for reproducing at least one still image, said apparatus comprising:

plural types of recording media contained in said apparatus, each being capable of recording music;

input means for inputting music into said apparatus from the exterior thereof;

recording means for recording music being input by said input means on said plural types of recording media;

selection means for selecting one of said plural types of recording media;

music reproducing means for reproducing music recorded on said recording medium selected by said selection means;

calculating means for calculating the time required to reproduce music to be reproduced; and still image reproducing means for reproducing said still image in different ways in accordance with the time calculated by said calculating means.

6. A still image reproducing apparatus in accordance with claim 5, wherein said still image includes pictures recorded in a developed film.

7. A still image reproducing apparatus in accordance with claim 5, wherein said plural types of recording media are rewritable and said apparatus further comprises another recording medium that is non-rewritable.

8. A still image reproducing apparatus in accordance with claim 7, wherein said selection means selects the non-rewritable recording medium and said music reproducing means reproduces music recorded on the non-rewritable recording medium.

9. A still image reproducing apparatus for reproducing at least one still image, said apparatus comprising:

a recording medium for recording music, which is integrated in said apparatus and non-detachable;

input means for inputting music into said apparatus from the exterior thereof;

recording means for recording music input by said input means on said recording medium;

music reproducing means for reproducing music recorded on said recording medium;

calculating means for calculating the time required to reproduce music to be reproduced; and still image reproducing means for reproducing said still image in different ways in accordance with the time calculated by said calculating means.

10. A still image reproducing apparatus in accordance with claim 9, further comprising rewrite means for rewriting music recorded on said recording medium in response to a music inputting operation of said input means.

11. A still image reproducing apparatus in accordance with claim 9, wherein said still image includes a picture recorded in a developed film.

12. A still image reproducing apparatus in accordance with claim 9, wherein said recording medium is a RAM integrated in said apparatus.

13. A still image reproducing apparatus in accordance with claim 9, wherein said still image reproducing means reproduces the still image on a display device that is separate from said apparatus.

14. A still image reproducing apparatus in accordance with claim 9, wherein said recording medium is capable of recording plural pieces of music and said music reproducing means includes selecting means for selecting at least one of said plural pieces and reproducing the selected piece.

15. A still image reproducing apparatus in accordance with claim 14, wherein said still image reproducing means reproduces the still image in different ways in accordance with the number of selected pieces of music.

16. A still image reproducing apparatus in accordance with claim 14, wherein said calculating means calculates the time required to reproduce the selected pieces of music.

17. A still image reproducing system for reproducing at least one still image, said system comprising:

a recording medium on which music is recorded;

music reproducing means for reproducing music recorded on said recording medium;

calculating means for calculating the time required to reproduce music to be reproduced; and still image reproducing means for reproducing said still image on a display device in different ways in accordance with the time calculated by said calculating means.

18. A still image reproducing system in accordance with claim 17, wherein said still image includes a picture recorded in a developed film.

19. A still image reproducing system in accordance with claim 17, wherein said recording medium has plural pieces of music recorded thereon, and said music reproducing means includes selecting means for selecting at least one of said plural pieces of music and reproducing selected pieces of music, and said calculating means calculates the time required to reproduce the selected pieces of music.

* * * * *